Feb. 19, 1935.  C. C. BUCHLER  1,991,540
FROST PREVENTION SYSTEM
Filed Jan. 13, 1932
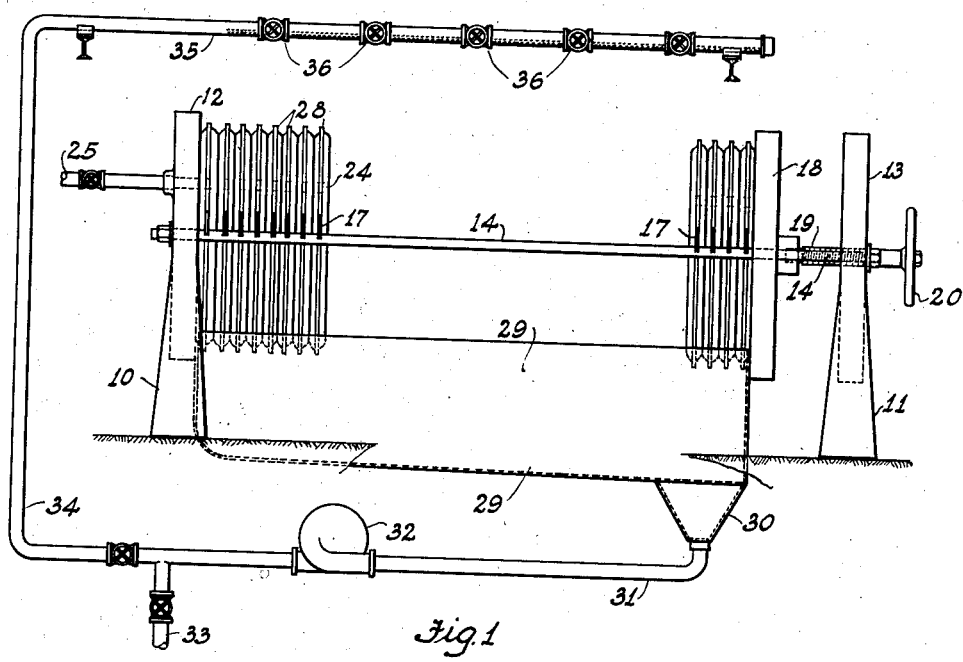
Fig. 1
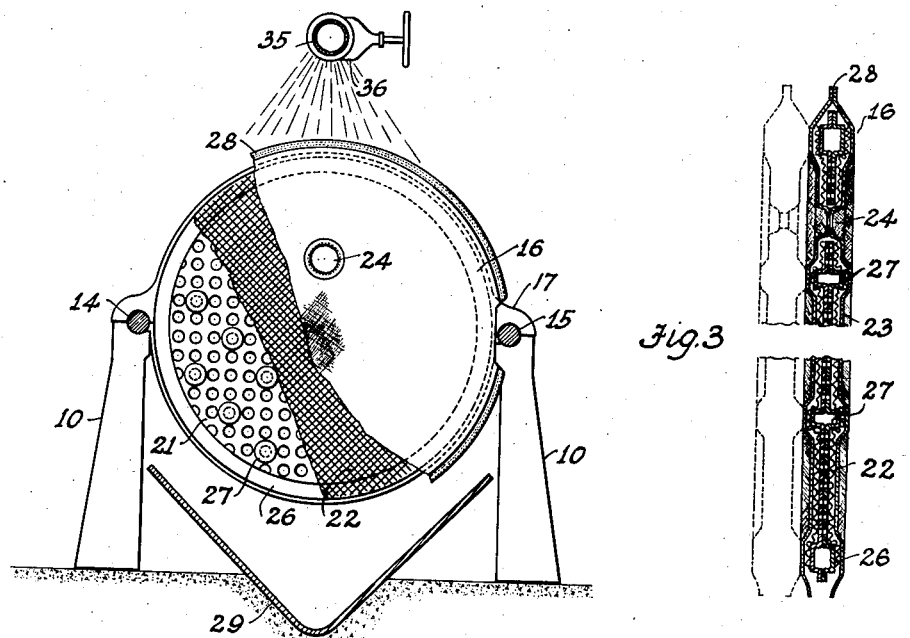
Fig. 2
Fig. 3
Clifford C. Buchler
INVENTOR
BY Bruce K. Brown
ATTORNEY

UNITED STATES PATENT OFFICE 1,991,540

FROST PREVENTION SYSTEM

Clifford C. Buchler, Casper, Wyo., assignor to Standard Oil Company, Chicago, Ill., a corporation of Indiana Application January 13, 1932, Serial No. 586,370

2 Claims. (Cl. 210—191)

This invention relates to a method and means for preventing the formation of frost and/or ice on cooled surfaces exposed to humid atmospheres, and it pertains more particularly to a filter system for separating wax from oil.

Lubricating oils usually contain a certain amount of wax which must be removed therefrom in order that the oils may pour or flow freely at low temperatures. It is standard refinery practice to dilute wax bearing oils with filter naphtha or other suitable diluent, cool the diluted mixture to a temperature of about —20° to —40° F. and "press" or filter the diluted oil from the wax which solidifies at this low temperature. The air in the filter press room usually contains a certain amount of moisture and when the press is chilled, this moisture freezes as ice or frost on the exposed parts of the press. A considerable amount of difficulty arises when the ice accumulates on the gaskets which separate the filter plates because the accumulation of ice prevents proper alignment of the plates and causes them to be warped in the press. An object of my invention is to provide a system for preventing the formation of ice and frost so that this difficulty will be avoided.

It is desirable in the filtration or pressing of wax-bearing oil that oxygen be kept out of the system, particularly if a special solvent is used as a diluent. An object of my invention is to seal the gasket area, or the portion of the filter cloth around the periphery of the filter, so that air cannot diffuse into the press.

A further object is to prolong the life of filter plates and filter cloths, to facilitate easy access thereto for cleaning purposes, and to increase the efficiency of the filter system. Other objects will be apparent from the following detailed description.

In the accompanying drawing which forms a part of this specification and in which similar parts are designated by the like reference characters throughout the several views:

Figure 1 is a side elevation of my improved filter system.

Figure 2 is a transverse section thereof with parts broken away.

Figure 3 is a detail showing the alignment of the buttons or spacing lugs which hold the filter plates apart and prevent warping thereof.

The filter press forms no part of my present invention and it may be described briefly as supporting members 10 and 11 carrying end plates 12 and 13 which, in turn, carry filter leaf support rods 14 and 15. The filter leaves 16 are suspended between rods 14 and 15 by means of suitable lugs 17. The leaves are brought together by movable head 18, which may be advanced or retarded by screw 19 threaded in fixed head 13 and operated by a suitable handle 20.

Likewise each filter leaf may be made in accordance with conventional practice. It may consist of a perforated steel plate 21 covered on both sides by a wire screen 22, the whole leaf being enveloped in a filter cloth or blanket 23. All of these elements are provided with aligned openings 24, which openings communicate with feed pipe 25. The filter cloths are preferably sewed together around the opening 24 in the plate, and the peripheries of the cloths are held against each other by flat annular flanges or rings 26 at the periphery of the filter leaves. Each filter leaf then consists of a perforated plate or coarse screen having on both sides a fine screen or filter cloth support which, in turn, is covered with the filter cloth itself, the filter cloth on opposite sides of the leaf being sewed together around the opening 24. That portion of the filter cloths which is between the annular rings may be called the "gasket area" since it is this portion of the cloths which forms a seal between the inside and outside of the filter chamber.

In order to prevent the filter plates 21 from warping and at the same time to provide uniform spaces between the adjoining filter leaves, I provide lugs or buttons 27 on the opposite sides of the filter plates, the buttons on one plate being adapted to fit against those of the adjacent plate. These may consist of cast lugs or they may consist of stamped projections on the surfaces of the plate.

It will be observed that when the filter leaves are clamped in position a fringe 28 of the filter cloths extend beyond the gasket area. It is in this fringe that moisture accumulates and it is through the gasket area of the filter that air sometimes penetrates.

In the normal operation of the filter a cold fluid such as wax-free oil, is first introduced into the press through pipe 25 to reduce this temperature to about —20° to —40° F. Then the chilled wax-bearing oil-diluent mixed is introduced through pipe 25 and it will be seen that this slurry fills all of the spaces between adjacent filter cloths, passing from leaf to leaf through apertures 24. The filtrate flows through screens 22 and adjacent plates or coarse screens 21 to periphery of the filter, and it drips therefrom through suitable holes in the bottom of rings 26 or through screen 22 into trough 29, which discharges into a sump 30 from which the oil is passed through pipe 31, pump 32 and pipe 33 to storage or to steam stills for separating oil from diluent. At intervals, when cakes of sufficient thickness are built up in the filter leaves, the movable head 18 is retracted, the filter leaves are separated and the wax cake is removed ("spudded") from the filter cloth.

In accordance with my invention I force a part of the wax-free oil through pipe 34 to perforated pipe 35, which may be provided with a plurality of valves 36 for regulating the effective length of the spray. The size of the perforations in pipe 35 should be regulated so that an even spray is obtained over the entire filter. Other equivalent means, of course, may be employed for accomplishing the same result. During the entire pressing period, which may be 30 to 40 hours, I spray oil over the exterior of the filter, and allow this oil to drip with the filtrate back into trough 29. This accomplishes a threefold purpose; it saturates the fringe 28 of the filter cloth with oil and prevents air from penetrating into the press, it prevents moisture from coming into contact with any part of the filter and thereby prevents the accumulation of frost and ice, and it acts as a cooling and insulating means assisting in maintaining the filter at a low temperature. Each of these features is important, but the first two deserve special consideration. By keeping air and moisture from penetrating through the gasket area of the filter cloths I avoided contamination of diluent and the deleterious effect thereof on the oil. By avoiding the formation of ice and frost I prevent the dishing or warping of the filter plates and I simplify to a great extent the cleaning of the press.

While I have described in detail a preferred embodiment of my invention, it should be understood that I do not limit myself to these details. The principle of my invention may be applied to any installation wherein it is desired to protect cooled surfaces from a humid atmosphere. I have disclosed a wax filter and an oil spray, but it should be understood that other apparatus and other liquids may be used for this purpose.

I claim:

1. In the operation of filter presses adapted to operate at temperatures below the freezing point of water wherein filter leaves are clamped against peripheral gaskets, the outside edges of which are exposed to moisture-containing atmosphere, the method of sealing the filter leaves at their peripheries and simultaneously preventing the accumulation of frost and ice on said gaskets and filter leaf edges, which comprises spraying onto the filter a portion of the cold filtrate which has been removed therefrom whereby any moisture which is solidified will be carried off of the filter by means of the continuously sprayed filtrate.

2. The method of preventing the formation and accumulation of frost and ice on a cooled filter press, which comprises continuously directing a stream of a cooled non-hygroscopic liquid comprising mineral oil onto said filter press so that frost and ice crystals are mechanically carried away without depositing on said filter press and without diluting or contaminating the non-hygroscopic liquid.

CLIFFORD C. BUCHLER.